United States Patent
Okuda et al.

(10) Patent No.: US 11,434,386 B2
(45) Date of Patent: Sep. 6, 2022

(54) WATER-BASED INK FOR INK-JET RECORDING

(71) Applicant: Brother Kogyo Kabushiki Kaisha, Nagoya (JP)

(72) Inventors: Satoshi Okuda, Inazawa (JP); Mitsunori Maeda, Nagoya (JP); Yuka Tsuzaka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 891 days.

(21) Appl. No.: 16/262,311

(22) Filed: Jan. 30, 2019

(65) Prior Publication Data

US 2019/0300735 A1   Oct. 3, 2019

(30) Foreign Application Priority Data

Mar. 30, 2018 (JP) .............................. JP2018-070304

(51) Int. Cl.
| | |
|---|---|
| *C09D 11/30* | (2014.01) |
| *C09D 11/328* | (2014.01) |
| *C09D 11/037* | (2014.01) |
| *C09D 11/033* | (2014.01) |
| *C09B 29/095* | (2006.01) |
| *C09B 55/00* | (2006.01) |
| *C09B 35/52* | (2006.01) |

(Continued)

(52) U.S. Cl.
CPC .......... *C09D 11/328* (2013.01); *C09B 29/095* (2013.01); *C09B 33/04* (2013.01); *C09B 35/52* (2013.01); *C09B 47/04* (2013.01); *C09B 55/009* (2013.01); *C09D 11/033* (2013.01); *C09D 11/037* (2013.01)

(58) Field of Classification Search
CPC ..... C09D 11/328; C09D 11/40; C09D 11/037; C09D 11/30; C09D 11/17; C09D 11/101; C09D 11/033; C09B 29/095; C09B 47/04; C09B 55/009
USPC ...................................................... 106/31.27
See application file for complete search history.

(56) References Cited

U.S. PATENT DOCUMENTS

| | | | |
|---|---|---|---|
| 6,511,171 B2 | 1/2003 | Yoshizawa et al. | |
| 7,703,908 B2 | 4/2010 | Nishizaki et al. | |
| (Continued) | | | |

FOREIGN PATENT DOCUMENTS

| | | | |
|---|---|---|---|
| JP | H08-327998 A | 12/1996 | |
| JP | H09-076629 A | 3/1997 | |
| (Continued) | | | |

OTHER PUBLICATIONS

STIC Search Report dated (Apr. 2, 2022).*
Oct. 26, 2021—(JP) Notice of Reasons for Refusal—App 2018-070304, Eng Tran.

*Primary Examiner* — Eisa B Elhilo
(74) *Attorney, Agent, or Firm* — Banner & Witcoff, Ltd.

(57) ABSTRACT

A water-based ink for ink-jet recording includes dyes and water. The dyes include a blue dye having a hue angle of 220° to 280°; a yellow dye having a hue angle of 70° to 120°; and a copper phthalocyanine dye. A mass ratio (C/B) of a content (C) of the copper phthalocyanine dye to a content (B) of the blue dye in an entire amount of the water-based ink is equal to or more than 0.5, and a total content of the dyes in the entire amount of the water-based ink is equal to or more than 6% by mass.

18 Claims, 1 Drawing Sheet

(51) Int. Cl.
*C09B 33/04* (2006.01)
*C09B 47/04* (2006.01)

(56) References Cited

U.S. PATENT DOCUMENTS

| | | |
|---|---|---|
| 8,016,404 B2 | 9/2011 | Kato et al. |
| 8,252,102 B2 | 8/2012 | Taga et al. |
| 8,603,232 B2 | 12/2013 | Tsuzaka et al. |
| 2002/0018107 A1 | 2/2002 | Yakushigawa et al. |
| 2002/0135649 A1 | 9/2002 | Yoshizawa et al. |
| 2002/0185034 A1* | 12/2002 | Koga .............. C09D 11/40 106/31.27 |
| 2005/0279251 A1* | 12/2005 | Koga .............. C09D 11/32 106/31.59 |
| 2006/0268084 A1 | 11/2006 | Nishizaki et al. |
| 2007/0186806 A1* | 8/2007 | Goto .............. C09D 11/40 106/31.48 |
| 2007/0186807 A1 | 8/2007 | Goto et al. |
| 2008/0241398 A1 | 10/2008 | Kato et al. |
| 2010/0101450 A1* | 4/2010 | Taga .............. C09D 11/328 347/100 |
| 2012/0081453 A1* | 4/2012 | Tsuzaka .......... C09D 11/328 347/20 |

FOREIGN PATENT DOCUMENTS

| | | |
|---|---|---|
| JP | 2002-212476 A | 7/2002 |
| JP | 2002-220555 A | 8/2002 |
| JP | 2002-256190 A | 9/2002 |
| JP | 2003-020428 A | 1/2003 |
| JP | 2003-055585 A | 2/2003 |
| JP | 2003-306621 A | 10/2003 |
| JP | 2004-175935 A | 6/2004 |
| JP | 2006-328140 A | 12/2006 |
| JP | 2007-217523 A | 8/2007 |
| JP | 2007-217531 A | 8/2007 |
| JP | 2008-246821 A | 10/2008 |
| JP | 2010-100745 A | 5/2010 |

\* cited by examiner

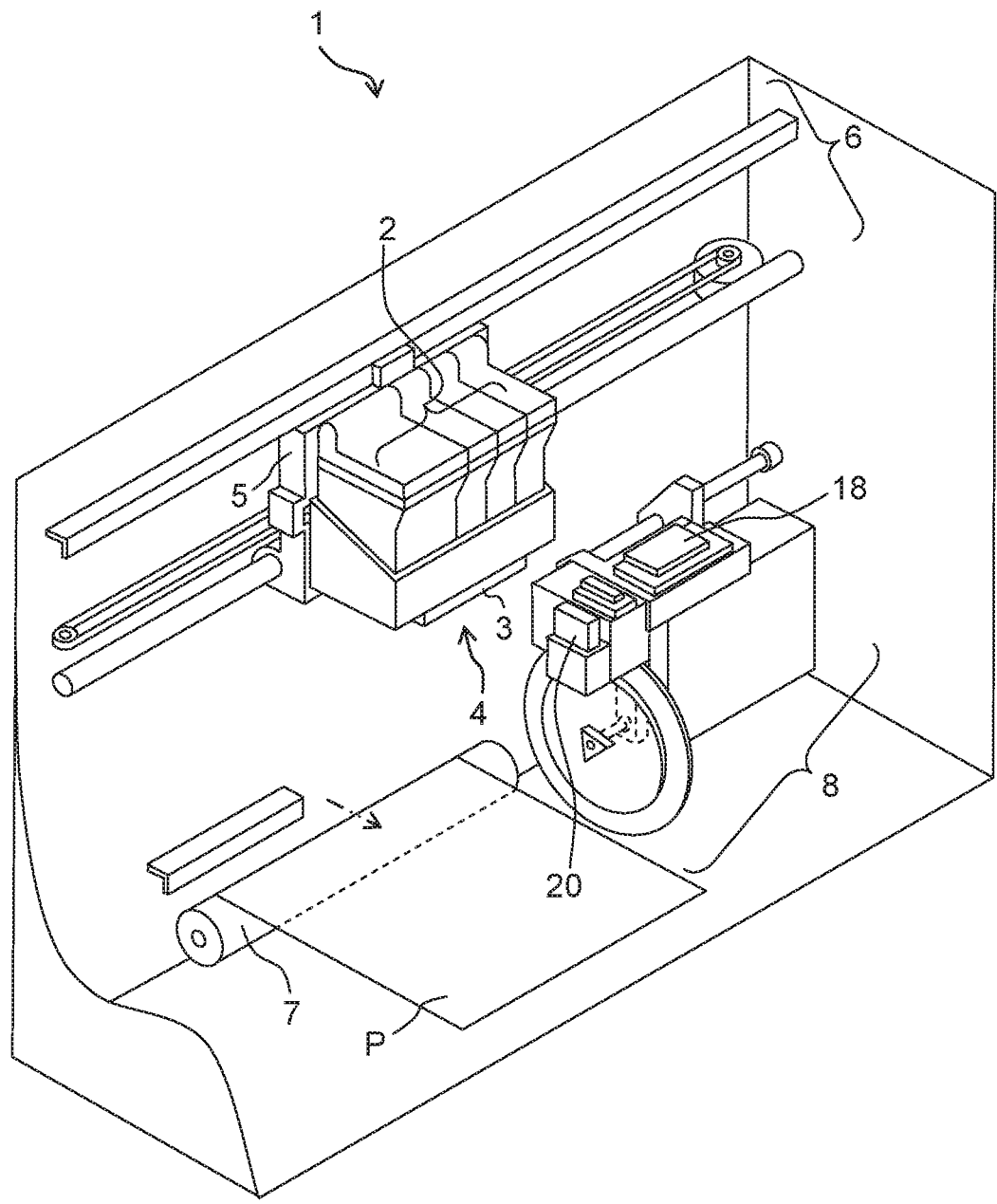

WATER-BASED INK FOR INK-JET RECORDING

CROSS REFERENCE TO RELATED APPLICATION

The present application claims priority from Japanese Patent Application No. 2018-070304 filed on Mar. 30, 2018, the disclosure of which is incorporated herein by reference in its entirety.

BACKGROUND OF THE INVENTION

Field of the Invention

The present invention is related to a water-based ink for ink-jet recording.

Description of the Related Art

As a water-based black dye ink for ink-jet recording that uses no black dye, there is a black dye ink obtained by mixing dyes of three primary colors of yellow, magenta, and cyan (see, for example, Japanese Patent Application Laid-open No. 2002-256190 corresponding to United States Patent Application Publication No. US2002/0135649).

SUMMARY OF THE INVENTION

The mixture of the dyes of the three primary colors, however, may not have sufficient optical density (OD value). In order to solve that problem, a blue dye may be used. The blue dye, however, typically has insufficient light resistance. The black using the blue dye may turn yellow or become reddened black after a long time has elapsed since recording.

In view of the above, an object of the present teaching is to provide a water-based dye ink for ink-jet recording (e.g., a water-based black dye ink) having a high OD value and high light resistance.

According to the present teaching, there is provided a water-based ink for ink-jet recording including dyes and water, the dyes including:

a blue dye having a hue angle of 220° to 280°;
a yellow dye having a hue angle of 70° to 120°; and
a copper phthalocyanine dye,
wherein a mass ratio (C/B) of a content (C) of the copper phthalocyanine dye to a content (B) of the blue dye in an entire amount of the water-based ink is equal to or more than 0.5, and
a total content of the dyes in the entire amount of the water-based ink is equal to or more than 6% by mass.

BRIEF DESCRIPTION OF THE DRAWINGS

A FIGURE is a schematic perspective view of an exemplary configuration of an ink-jet recording apparatus of the present teaching.

DESCRIPTION OF THE EMBODIMENTS

A water-based ink of the present teaching is explained. The water-based ink of the present teaching includes dyes and water. The dyes include a blue dye having a hue angle of 220° to 280°, a yellow dye having a hue angle of 70° to 120°, and a copper phthalocyanine dye.

In the present teaching, a hue angle means, for example, an angle in accordance with an $L^*a^*b^*$ color system chromaticity diagram in which $a^*$ and $b^*$ are represented on a plane. The hue angle is defined as follows:

when satisfying $a^*{\geq}0$ and $b^*{\geq}0$ (the first quadrant), the hue angle is $\tan^{-1}(b^*/a^*)$;

when satisfying $a^*{\leq}0$ and $b^*{\geq}0$ (the second quadrant), the hue angle is $180°+\tan^{-1}(b^*/a^*)$;

when satisfying $a^*{\leq}0$ and $b^*{\leq}0$ (the third quadrant), the hue angle is $180°+\tan^{-1}(b^*/a^*)$; and when satisfying $a^*{\geq}0$ and $b^*{\leq}0$ (the fourth quadrant), the hue angle is $360°+\tan^{-1}(b^*/a^*)$.

In the present teaching, the hue angles of the blue dye and the yellow dye are determined as follows. Namely, color measurement is performed, for example, on 0.001 to 0.002% by mass of aqueous solution of the blue-dye or 0.001 to 0.002% by mass of aqueous solution of the yellow-dye using a spectrophotometer UV3600 manufactured by Shimadzu corporation to determine a $L^*$ value, $a^*$ value, and $b^*$ value. In the measurement, a measuring cell having a cell length of 10 mm is used and purified water is used as a reference. The hue angle of each of the blue dye and the yellow dye is determined using the $a^*$ value and the $b^*$ value in accordance with the definition formula of the hue angle as described above. The $L^*$ value, $a^*$ value, and $b^*$ value are determined based on the $L^*a^*b^*$ color system (CIE 1976 ($L^*a^*b^*$) color system) normalized or standardized by Commission Internationale d'Eclairage (CIE) in 1976 (see, JIS Z 8729).

The blue dye is exemplified, for example, by C.I. Acid Blues 90, 9, 1, 7, 15, 23, 25, 40, 61:1, 62, 72, 74, 80, 83, 92, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 249, 258, 260, 264, 277:1, 278, 279, 280, 284, 290, 296, 298, 300, 317, 324, 333, 335, 338, 342, 350. The blue dye is different in kind from the copper phthalocyanine dye. The blue dye may not have, for example, a phthalocyanine structure.

Only one kind of the blue dye as described above may be used singly, or two or more kinds of the blue dyes may be used in combination. The content (B) of the blue dye in the entire amount of the water-based ink is, for example, 0.3 to 5% by mass, 0.5 to 3.6% by mass, or 1 to 3.5% by mass.

The yellow dye is exemplified, for example, by C.I. Direct Yellows 86, 132, 8, 11, 12, 21, 28, 33, 39, 44, 49, 50, 85, 87, 88, 89, 98, 100, 110, 114, 146.

Only one kind of the yellow dye as described above may be used singly, or two or more kinds of the yellow dyes may be used in combination. The content of the yellow dye in the entire amount of the water-based ink is, for example, 1 to 3% by mass, 1.5 to 2.5% by mass, or 1.7 to 2.4% by mass.

The copper phthalocyanine dye is exemplified, for example, by C.I. Direct Blue 199. The copper phthalocyanine dye is different in kind from the blue dye.

Only one kind of the copper phthalocyanine dye as described above may be used singly, or two or more kinds of the copper phthalocyanine dye may be used in combination. The content (C) of the copper phthalocyanine dye in the entire amount of the water-based ink is, for example, 1 to 5% by mass, 1.3 to 4% by mass, or 1.8 to 3.5% by mass.

The mass ratio (C/B) of the content (C) of the copper phthalocyanine dye to the content (B) of the blue dye in the entire amount of the water-based ink satisfies C/B${\geq}$0.5. Namely, the mass ratio (C/B) is equal to or more than 0.5. The water-based ink including the blue dye has a sufficient optical density (OD value). Making the mass ratio (C/B) equal to or more than 0.5 results in the following effect. For example, if the blue dye deteriorates due to light, the phthalocyanine dye having high light resistance inhibits a decrease in the optical density (OD value) and a hue balance of a recorded image is not likely to be lost. Accordingly, a change in color of the water-based ink is inhibited after a long time has passed since recording. Namely, the water-based ink has high light resistance. When the water-based ink is a water-based black ink, black of a recorded image is not likely to turn yellow or become reddened black after a long time has passed since recording. The mass ratio (C/B) may be, for example, equal to or less than 8.0. The mass ratio (C/B) may satisfy, for example, 0.6≤C/B≤3.5. Making the mass ratio satisfy 0.6≤C/B≤3.5 improves light resistance.

The water-based ink may satisfy, for example, the following condition (1). Making the water-based ink satisfy the following condition (1) improves light resistance. Light irradiation using a xenon weather meter under the condition (1) can be performed, for example, by a method described in a light resistance evaluation in Examples described below. The conditions at the time of light irradiation are, for example, as follows: inner-tank temperature: 23° C., inner-tank relative humidity: 50%, and illuminance: 81 klx.

$$LB > LY > LC \quad (1)$$

LB: OD value reduction percentage (%) of an image recorded on glossy paper at 100% Duty by use of 4% by mass of aqueous solution of the blue dye, the reduction percentage being determined by the following equation (I)

LY: OD value reduction percentage (%) of an image recorded on glossy paper at 100% Duty by use of 4% by mass of aqueous solution of the yellow dye, the reduction percentage being determined by the following equation (I)

LC: OD value reduction percentage (%) of an image recorded on glossy paper at 100% Duty by use of 4% by mass of aqueous solution of the copper phthalocyanine dye, the reduction percentage being determined by the following equation (I)

$$\text{OD value reduction percentage (\%)} = \{(X-Y)/X\} \times 100 \quad (I)$$

X: OD value of the image immediately after recording

Y: OD value of the image after light irradiation is performed for 70 hours by use of the xenon weather meter In the present teaching, Duty is defined, for example, by the following equation, and the same is true of the following description. The glossy paper is exemplified, for example, by photo glossy paper BP71 manufactured by BROTHER KOGYO KABUSHIKI KAISHA, and the same is true of the following description.

Duty (%)=real recording dot number/(longitudinal resolution×lateral resolution)×100

Real recording dot number: real recording dot number per unit area;

Longitudinal resolution: longitudinal resolution per unit area;

Lateral resolution: lateral resolution per unit area.

The dyes of the water-based ink may further include a magenta dye having a hue angle of 330° to 360° or 0° to 10°. The hue angle of the magenta dye is calculated, for example, by the same method as above used for the blue dye and the yellow dye.

The magenta dye is exemplified, for example, a dye represented by the formula (1):

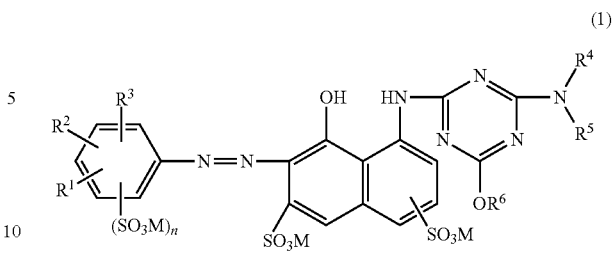

in the formula (1), n is 0, 1, or 2 each of $R^1$, $R^2$, and $R^3$ is a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, a sulfonic ester group, a substituted or non-substituted alkylsulfonyl group, a substituted or non-substituted arylsulfonyl group, a carboxy group, or a carboxylic ester group;

$R^1$, $R^2$ and $R^3$ may be identical to or different from each other;

each of $R^4$, $R^5$ and $R^6$ is a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, or a substituted or non-substituted heterocyclic group;

$R^4$, $R^5$ and $R^6$ may be identical to or different from each other;

when any one of $R^1$ to $R^6$ has an acid group, a part or all of the acid group(s) may be in a salt form, namely, when any one of $R^1$ to $R^6$ has at least one acid group, the at least one acid group is non-neutralized acid or salt thereof;

each of three Ms is H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, or $C_2H_4NH_2$; and the three Ms may be identical to or different from each other.

In the formula (1), the substituted or non-substituted alkyl group in $R^1$, $R^2$ and $R^3$ is preferably an alkyl group having 1 to 9 carbon atom(s) in total. The substituted or non-substituted alkyl group is exemplified, for example, by methyl group, ethyl group, n-propyl group, isopropyl group, n-butyl group, trifluoromethyl group, and dimethylaminomethyl group. The substituent of the substituted alkyl group is exemplified, for example, by hydroxyl group; alkoxy group such as methoxy group and ethoxy group; cyano group; halogen atom such as fluorine atom, chlorine atom, bromine atom, and iodine atom; and ionic hydrophilic group such as carboxylate and sulfonate.

In the formula (1), the substituted or non-substituted alkoxy group in $R^1$, $R^2$ and $R^3$ is preferably an alkoxy group having 1 to 9 carbon atom(s) in total. The substituted or non-substituted alkoxy group is exemplified, for example, by methoxy group, isopropoxy group, and n-butoxy group.

In the formula (1), the halogen atom in $R^1$, $R^2$ and $R^3$ is exemplified, for example, by fluorine atom, chlorine atom, bromine atom, and iodine atom.

In the formula (1), the substituted or non-substituted carbamoyl group in $R^1$, $R^2$ and $R^3$ is exemplified, for example, by carbamoyl group, N—N-dimethylcarbamoyl group, and phenylcarbamoyl group.

In the formula (1), the substituted or non-substituted sulfamoyl group in $R^1$, $R^2$ and $R^3$ is exemplified, for example, by sulfamoyl group, N-methylsulfamoyl group, N-ethylsulfamoyl group, N-ethyl-N-phenylsulfamoyl group, N,N-dimethylsulfamoyl group, and p-carboxyphenylsulfamoyl group.

In the formula (1), the substituted or non-substituted amino group in $R^1$, $R^2$ and $R^3$ is exemplified, for example, by N-methylamino group, carbamoylamino group, N,N-diethylamino group, and acetylamino group.

In the formula (1), the sulfonic acid ester group in $R^1$, $R^2$ and $R^3$ is exemplified, for example, by phenoxysulfonyl group.

In the formula (1), the substituted or non-substituted alkylsulfonyl group in $R^1$, $R^2$ and $R^3$ is preferably an alkylsulfonyl group having 1 to 9 carbon atom(s) in total. The substituted or non-substituted alkylsulfonyl group is exemplified, for example, by hydroxysulfonyl group.

In the formula (1), the substituted or non-substituted arylsulfonyl group in $R^1$, $R^2$ and $R^3$ is preferably an arylsulfonyl group having 6 to 15 carbon atoms in total. The substituted or non-substituted arylsulfonyl group is exemplified, for example, by benzylsulfonyl group.

In the formula (1), the carboxylic acid ester group in $R^1$, $R^2$ and $R^3$ is exemplified, for example, by methoxycarbonyl group.

In the formula (1), the substituted or non-substituted alkyl group in $R^4$, $R^5$ and $R^6$ is preferably an alkyl group having 1 to 18 carbon atom(s) in total. The substituted or non-substituted alkyl group is exemplified, for example, by ethyl group, n-butyl group, n-octyl group, ethylhexyl group, hydroxyethyl group, carboxypropryl group, carboxycyclohexylmethyl group, 1-carboxy-2-mercapto-ethyl group, 1-carboxy-2-carbamoyl-ethyl group, 1-isopropyl-1-carboxymethyl group, and 1,2-dicarboxypropyl group. The substituent of the substituted alkyl group is exemplified, for example, by hydroxyl group; alkoxy group such as methoxy group and ethoxy group; cyano group; halogen atom such as fluorine atom, chlorine atom, bromine atom, and iodine atom; and ionic hydrophilic group such as carboxylate and sulfonate.

In the formula (1), the substituted or non-substituted alkenyl group in $R^4$, $R^5$ and $R^6$ is preferably an alkenyl group having 2 to 18 carbon atoms in total. The substituted or non-substituted alkenyl group is exemplified, for example, by 2-methyl-1-propenyl group, vinyl group, and allyl group.

In the formula (1), the substituted or non-substituted aryl group in $R^4$, $R^5$ and $R^6$ is exemplified, for example, by 3,4-dicarboxyphenyl group, 4-butylphenyl group, and 4-carboxyphenyl group. The substituent of the substituted aryl group is exemplified, for example, by those same as the above-described exemplified substituents for the substituted alkyl group.

In the formula (1), the substituted or non-substituted aralkyl group in $R^4$, $R^5$ and $R^6$ is exemplified, for example, by benzyl group, 1-carboxy-2-phenyl-ethyl group, 1-carboxy-2-hydroxyphenylethyl group, and 4-carboxybenzyl group.

In the formula (1), the substituted or non-substituted alicyclic group in $R^4$, $R^5$ and $R^6$ is exemplified, for example, by cyclohexyl group and 4-carboxycyclohexyl group.

In the formula (1), the substituted or non-substituted heterocyclic group in $R^4$, $R^5$ and $R^6$ is exemplified, for example, by pyridyl group, thiadiazolyl group, benzothiazolyl group, and 2,2,6,6-tetramethylpiperidinyl group. The substituent of the substituted heterocyclic group is exemplified, for example, by those same as the above-described exemplified substituents for the substituted alkyl group.

In the formula (1), at least one of $R^4$, $R^5$ and $R^6$ may be an alkyl group, alkenyl group, aryl group, alicyclic group, aralkyl group or heterocyclic group, which is substituted by one to four pieces of carboxy group(s) or sulfamoyl group(s).

In the formula (1), each of $R^4$ and $R^5$ may be a hydrogen atom or a tri-substituted phenyl group, and $R^4$ and $R^5$ may be identical to or different from each other. Here, each of three substituents of the tri-substituted phenyl group is a hydrogen atom, a halogen atom, a hydroxyl group, a substituted or non-substituted alkyl group having 1 to 9 carbon atom(s) in total, a substituted or non-substituted alkoxy group having 1 to 9 carbon atom(s) in total, a substituted or non-substituted carbamoyl group, a substituted or non-substituted sulfamoyl group, a substituted or non-substituted amino group, a nitro group, a sulfonic acid ester group, or a carboxylic acid ester group. The aforementioned three substituents may be identical to or different from each other.

A preferable aspect of the dye represented by the formula (1) is exemplified, for example, by an aspect wherein in the formula (1), at least one of $R^4$, $R^5$ and $R^6$ is an alkyl group, an alkenyl group, an aryl group, an aralkyl group, or a cyclohexyl group, which is substituted by one to four pieces of carboxy group(s) or sulfamoyl group(s).

Regarding the dye represented by the formula (1), the number of sulfonic group, carboxy group, or the salt thereof in its structure is preferably six or less in total, more preferably five or less in total, and much more preferably four or less in total.

Another preferable aspect of the dye represented by the formula (1) is exemplified, for example, by an aspect wherein in the formula (1):
n is 0;
$R^1$ is a carboxy group, a carbamoyl group, a trifluoromethyl group, or a sulfamoyl group;
$R^2$, $R^3$ and $R^5$ each are a hydrogen atom;
$R^4$ is a phenyl group optionally substituted by a carboxy group or a sulfamoyl group, or a carboxy alkyl group;
$R^6$ is a hydrogen atom or an alkyl group;
when any one of $R^1$ to $R^6$ has an acid group, a part or all of the acid group(s) may be in a salt form;
each of three Ms is any one of H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$ and $C_2H_4NH_2$.

The dye represented by the formula (1) can be manufactured in accordance with known methods. For example, it can be manufactured by the method disclosed in U.S. Pat. No. 8,603,232.

Preferable specific examples of the dye represented by the formula (1) include compounds represented by the following formulae (1-1) to (1-5).

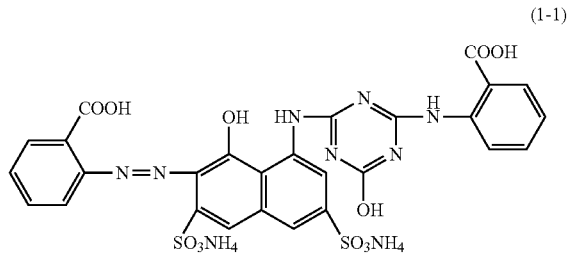

(1-1)

The compound represented by the formula (1-1) is an aspect wherein in the formula (1),
n is 0;
$R^1$ is a carboxy group at the 2-position of a phenyl group bonded to an azo group;
$R^2$, $R^3$ and $R^5$ each are a hydrogen atom;
$R^4$ is a 2-carboxyphenyl group;
$R^6$ is a hydrogen atom; and
M is $NH_4$.

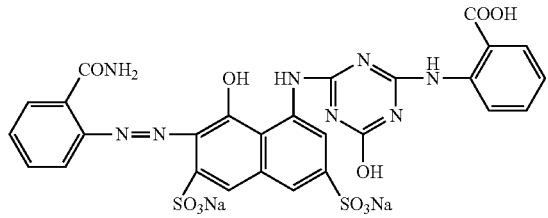

(1-2)

The compound represented by the formula (1-2) is an aspect wherein in the formula (1),
n is 0;
$R^1$ is a carbamoyl group at the 2-position of a phenyl group bonded to an azo group;
$R^2$, $R^3$ and $R^5$ each are a hydrogen atom;
$R^4$ is a 2-carboxyphenyl group;
$R^6$ is a hydrogen atom; and
M is Na.

(1-3)

The compound represented by the formula (1-3) is an aspect wherein in the formula (1),
n is 0;
$R^1$ is a sulfamoyl group at the 3-position of a phenyl group bonded to an azo group;
$R^2$, $R^3$ and $R^5$ each are a hydrogen atom;
$R^4$ is a 2-sulfamoylphenyl group;
$R^6$ is an isopropyl group; and
M is $NH_3C_2H_5$.

(1-4)

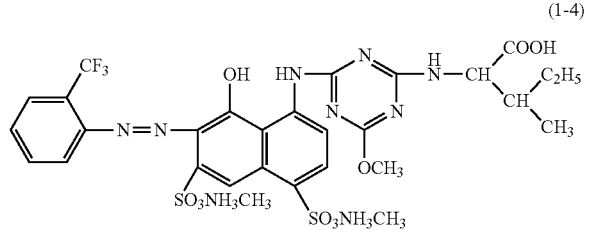

The compound represented by the formula (1-4) is an aspect wherein in the formula (1),
n is 0;
$R^1$ is a trifluoromethyl group at the 2-position of a phenyl group bonded to an azo group;
$R^2$, $R^3$ and $R^5$ each are a hydrogen atom;
$R^4$ is a 1-carboxy-2-methylbutyl group;
$R^6$ is a methyl group; and
M is $NH_3CH_3$.

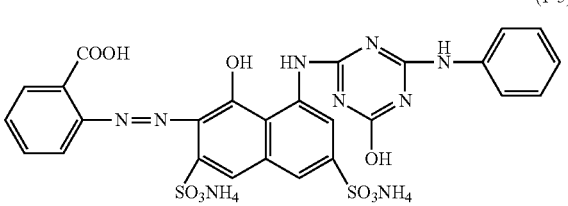

(1-5)

The compound represented by the formula (1-5) is an aspect wherein in the formula (1),
n is 0;
$R^1$ is a carboxy group at the 2-position of a phenyl group bonded to an azo group;
$R^2$, $R^3$ and $R^5$ each are a hydrogen atom;
$R^4$ is a phenyl group;
$R^5$ is a hydrogen atom; and
M is $NH_4$.

Only one kind of the magenta dye as described above may be used singly, or two or more kinds of the magenta dyes may be used in combination. The content of the magenta dye in the entire amount of the water-based ink is, for example, 0.5 to 2% by mass, 0.7 to 1.4% by mass, or 0.9 to 1.2% by mass.

The water-based ink may satisfy, for example, the following condition (2) or condition (3). Making the water-based ink satisfy the condition (2) or condition (3) improves light resistance. Light irradiation using the xenon weather meter under the condition (2) or condition (3) can be performed similarly, for example, to the light irradiation using the xenon weather meter under the condition (1).

$$LB > LM > LC \qquad (2)$$

$$LB > LY > LM > LC \qquad (3)$$

LB: OD value reduction percentage (%) of an image recorded on glossy paper at 100% Duty by use of 4% by mass of aqueous solution of the blue dye, the reduction percentage being determined by the following equation (I)

LY: OD value reduction percentage (%) of an image recorded on glossy paper at 100% Duty by use of 4% by mass of aqueous solution of the yellow dye, the reduction percentage being determined by the following equation (I)

LM: OD value reduction percentage (%) of an image recorded on glossy paper at 100% Duty by use of 4% by mass of aqueous solution of the magenta dye, the reduction percentage being determined by the following equation (I)

LC: OD value reduction percentage (%) of an image recorded on glossy paper at 100% Duty by use of 4% by mass of aqueous solution of the copper phthalocyanine dye, the reduction percentage being determined by the following equation (I)

$$\text{OD value reduction percentage (\%)} = \{(X-Y)/X\} \times 100 \qquad (I)$$

X: OD value of the image immediately after recording
Y: OD value of the image after light irradiation is performed for 70 hours by use of the xenon weather meter The total content of the dyes in the entire amount of the water-based ink is equal to or more than 6% by mass. In the present teaching, the water-based dye ink for ink-jet recording (e.g., the water-based black dye ink) having a high OD value and high light resistance can be provided by using both the blue dye and the copper phthalocyanine dye and making the total content of the dyes equal to or more than 6% by mass. The total content may be, for example, equal to or more than 9% by mass. Making the total content equal to or more than 9% by mass results in the water-based ink having a higher OD value. In view of jetting stability, the total content is preferably 6 to 10% by mass.

A colorant in the water-based ink may consist only of the blue dye, the yellow dye, and the copper phthalocyanine dye. Or, the magenta dye may be added so that the colorant in the water-based ink consists only of the blue dye, the yellow dye, the copper phthalocyanine dye, and the magenta dye. The water-based ink of the present teaching may include any other colorant to an extent that the hue balance is not lost thereby. Further, the water-based ink may or may not include, for example, a black dye. The content of any other colorant(s) with respect to the total content of the blue dye and the yellow dye or with respect to the total content of the blue dye, the yellow dye and the magenta dye is, for example, equal to or less than 20% by mass, equal to or less than 10% by mass, or 0% by mass. In view of light resistance (change in hue balance), it is preferable that the water-based ink does not substantially include pigment. The content of the pigment in the water-based ink is, for example, equal to or less than 0.1% by mass, equal to or less than 0.01% by mass, or 0% by mass.

The water is preferably ion-exchanged water or pure water (purified water). The content of the water in the entire amount of the water-based ink may be, for example, 10 to 90% by mass, 40 to 80% by mass, or 50 to 80% by mass. The content of the water in the entire amount of the water-based ink may be, for example, a balance of the other components.

The water-based ink may further include a water-soluble organic solvent. The water-soluble organic solvent is exemplified, for example, by a humectant that inhibits the water-based ink from drying at an end of a nozzle of an ink-jet head and a penetrant that adjusts drying velocity on a recording medium.

The humectant is not particularly limited, which is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. Only one kind of the humectant as described above may be used singly, or two or more kinds of the humectants may be used in combination. Among the above, the polyvalent alcohol such as alkylene glycol and glycerol is preferably used.

The content of the humectant in the entire amount of the water-based ink is, for example, 0 to 95% by mass, 5 to 80% by mass, or 5 to 50% by mass.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Only one kind of the penetrant as described above may be used singly, or two or more kinds of the penetrants may be used in combination.

The content of the penetrant in the entire amount of the water-based ink is, for example, 0 to 20% by mass, 0 to 15% by mass, or 1 to 6% by mass.

The water-based ink may further include a conventionally known additive, as necessary. The additive is exemplified, for example, by surfactants, pH-adjusting agents, viscosity-adjusting agents, surface tension-adjusting agents, and fungicides. The viscosity-adjusting agents are exemplified, for example, by polyvinyl alcohol, cellulose, and water-soluble resins.

The water-based ink may be prepared, for example, by mixing the blue dye, the yellow dye, the copper phthalocyanine dye, the water, and optionally other additive component(s) as necessary uniformly or homogeneously through any conventionally known method and then removing undissolved matters by a filter or the like.

As described above, the present teaching can provide the water-based dye ink for ink-jet recording (e.g., the water-based black dye ink) having a high OD value and high light resistance by using both the blue dye and the copper phthalocyanine dye and making the total content of the dyes equal to or more than 6% by mass.

Subsequently, an ink-jet recording apparatus of the present teaching is described.

The ink-jet recording apparatus of the present teaching is an ink-jet recording apparatus characterized by including: an ink storing section storing an ink; and an ink-jetting mechanism configured to jet the ink stored in the ink storing section, wherein the ink stored in the ink storing section is the water-based ink for ink-jet recording of the present teaching.

The FIGURE depicts an exemplary configuration of the ink-jet recording apparatus of the present teaching. As depicted in the FIGURE, an ink-jet recording apparatus 1 of the present teaching includes four ink cartridges 2, an ink jetting mechanism (ink-jet head) 3, a head unit 4, a carriage 5, a driving unit 6, a platen roller 7 and a purge device 8 as main constitutive components or parts.

Each of the four ink cartridges 2 stores the corresponding one of four water-based inks of yellow, magenta, cyan, and black. For example, the water-based black ink is the water-based ink for ink-jet recording of the present teaching. Although this example uses a set with the four ink cartridges 2, instead of this, the present teaching may use an integrated type ink cartridge of which interior is comparted to form a water-based yellow ink accommodating section, a water-based magenta ink accommodating section, a water-based cyan ink accommodating section, and a water-based black ink accommodating section. As a body of the ink cartridge, for example, any conventionally known main body (body) of an ink cartridge can be used.

The ink-jet head 3 disposed on the head unit 4 performs recording on a recording medium P (e.g., recording paper). The four ink cartridges 2 and the head unit 4 are provided or arranged on the carriage 5. The driving unit 6 causes the carriage 5 to reciprocate in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (see, for example, Japanese Patent Application laid-open No. 2008-246821 corresponding to United States Patent Application Publication No. US2008/0241398 A1).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In the FIGURE, in order to prevent the water-based inks from drying, a cap 18 covers a plurality of nozzles of the ink-jet head 3 which is returned to a reset position upon completion of the recording.

In the ink-jet recording apparatus 1 of this example, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, each of the four ink cartridges 2 and the head unit 4 which is provided on the carriage 5 are connected with a tube, etc., and the water-based inks are supplied from the four cartridges 2, respectively, to the head unit 4 via the tubes. Further, in these aspects, it is allowable to use four ink bottles having a bottle shape, instead of using the four ink cartridges 2. In such a case, each of the ink bottles is preferably provided with an inlet port via which the ink is poured from the outside to the inside of the ink bottle.

Ink-jet recording using the ink-jet recording apparatus 1 is performed, for example, in the following manner. Namely, at first, the recording paper P is supplied or fed from a paper feeding cassette or sheet feeding cassette (not depicted in the drawing) arranged at a side of or at a position below the ink-jet recording apparatus 1. The recording paper P is introduced or guided between the ink-jet head 3 and the platen roller 7. Then, predefined recording is performed on the fed or introduced recording sheet P with the water-based ink(s) jetted from the ink-jet head 3. The recording paper P after recording is discharged from the ink-jet recording apparatus 1. According to the present teaching, a recorded matter having a high OD value and high light resistance can be obtained. In the FIGURE, illustration of the feed mechanism and discharge mechanism for the recording paper P is omitted.

In the apparatus depicted in the FIGURE, an ink-jet head of serial type (serial type ink-jet head) is adopted. The present teaching, however, is not limited to this. The ink-jet recording apparatus may be an apparatus adopting an ink-jet head of line type (line type ink-jet head).

The ink-jet recording method of the present teaching is characterized by performing recording by jetting a water-based ink onto a recording medium in accordance with an ink-jet system, wherein the water-based ink for ink-jet recording of the present teaching is used as the water-based ink. The recording includes printing a letter (text), printing an image, printing, etc.

EXAMPLES

Next, Examples of the present teaching are explained together with Comparative Examples. Note that the present teaching is not limited by and is not restricted to the Examples and the Comparative Examples described below.

Examples 1 to 8 and Comparative Examples 1 to 5

Ingredients which were included in Ink Composition (Table 1) were mixed uniformly or homogeneously; and thus a mixture was obtained. Subsequently, the obtained mixture was filtrated through a polytetrafluoroethylene (PTFE)-type membrane filter (pore size 0.20 μm) produced by Toyo Roshi Kaisha, Ltd., and thus each of water-based inks of Examples 1 to 8 and Comparative Examples 1 to 5 was obtained. In Table 1, a dye (M-1) indicates the compound represented by the formula (1-1).

For the water-based inks of Examples 1 to 8 and Comparative Examples 1 to 5, (a) optical density (OD value) evaluation and (b) light resistance evaluation were carried out by means of the following methods.

(a) Optical Density (OD Value) Evaluation

Evaluation samples were made by recording images on regular paper (Office Paper produced by FUJITSU COWORCO LIMITED) by an ink-jet printer-equipped digital multifunction machine DCP-J4225N produced by BROTHER KOGYO KABUSHIKI KAISHA in which the water-based inks according to Examples and Comparative Examples were used. Optical densities (OD values) of three locations or portions in each of the evaluation samples were measured by using a spectrophotometric colorimetry meter SpectroEye (light source: D50; field: 2°; ANSI-T) produced by X-Rite Inc. Then, an average value of the optical densities was found and evaluated in accordance with the following evaluation criteria.

<Evaluation Criteria for Optical Density (OD Value) Evaluation>

AA: The optical density (OD value) exceeded 1.0;

A: The optical density (OD value) was equal to or more than 0.9 and was equal to less than or 1.0;

C: The optical density (OD value) was less than 0.9.

(b) Light Resistance Evaluation

The ink-jet printer-equipped digital multifunction machine DCP-J4225N, in which the water-based inks according to Examples and Comparative Examples were used, was used to record gradation patches of the water-based inks on glossy paper (photo glossy paper BP71 produced by BROTHER KOGYO KABUSHIKI KAISHA). Of the gradation patches, a patch in an initial OD value (an OD value of an image immediately after recording) was 1.0, was used as an evaluation sample. The OD value was measured similarly to the optical density (OD value) evaluation. Using SX75 (super xenon weather meter) produced by SUGA TEST INSTRUMENTS CO., LTD, the evaluation sample was irradiated with light from a xenon lamp for 70 hours under the conditions that the temperature in the chamber was 23° C., the relative humidity in the chamber was 50%, and the illuminance was 81 klx. Next, the cyan (C) component, the magenta (M) component and the yellow (Y) component in the OD value of the evaluation sample after light irradiation were measured in the same manner as described above. Then, in each of the cyan (C) component, the magenta (M) component and the yellow (Y) component, the OD value reduction percentage (%) was determined according to the following equation (I) and the light resistance evaluation was performed in accordance with the following evaluation criteria. The smaller the OD value reduction percentage (%), the less the deterioration in image quality, which means the light resistance was high.

Further, the OD value reduction percentage (LB) of the image recorded on the glossy paper at 100% Duty by using 4% by mass of aqueous solution of C.I. Acid Blue 90, the OD value reduction percentage (LY1) of the image recorded on the glossy paper at 100% Duty by using 4% by mass of aqueous solution of C.I. Direct Yellow 86, the OD value reduction percentage (LY2) of the image recorded on the glossy paper at 100% Duty by using 4% by mass of aqueous solution of C.I. Direct Yellow 132, the OD value reduction percentage (LM) of the image recorded on the glossy paper at 100% Duty by using 4% by mass of aqueous solution of the dye (M-1), and the OD value reduction percentage (LC) of the image recorded on the glossy paper at 100% Duty by using 4% by mass of aqueous solution of C.I. Direct Blue 199, the above dyes being used in the water-based inks of Examples and Comparative Examples, were determined similarly to the above. The magnitude relation of the OD value reduction percentage was LB>LY1>LY2>LM>LC.

OD value reduction percentage (%)={($X-Y$)/$X$}×100   (I)

X: 1.0 (initial OD value)
Y: OD value after light irradiation

<Evaluation Criteria for Light Resistance Evaluation>
(C component, M component, Y component)

AAA: The reduction percentages of the C component, the M component, the and Y component in the OD values were respectively less than 5%;

AA: The reduction percentages of the C component, the M component, and the Y component in the OD values were respectively equal to or more than 5% and less than 12%;

A: The reduction percentages of the C component, the M component, and the Y component in the OD values were respectively equal to or more than 12% and less than 15%;

B: The reduction percentages of the C component, the M component, and the Y component in the OD values respectively exceeded 15%.

<Evaluation Criteria for Light Resistance Evaluation>
(Total Evaluation)

AA: All the evaluation results of the C component, the M component, and the Y component were AAA or AA;

A: Each of the evaluation results of the C component, the M component, and the Y component was AAA, AA, or A;

B: Any of the evaluation results of the C component, the M component, and the Y component was B.

Table 1 indicates the ink compositions and evaluation results of Examples 1 to 8 and Comparative Examples 1 to 5.

Table 1 (Following)—Legend

1: Nonionic Surfactant produced by Nissin Chemical Industry Co., Ltd.; the numeric value in Table 1 indicates the active ingredient amount.

2: Anionic Surfactant produced by Lion Specialty Chemicals Co., Ltd.; active ingredient: 28% by weight; the numeric value in Table 1 indicates the active ingredient amount.

TABLE 1

| | | Examples | | | | | | | |
|---|---|---|---|---|---|---|---|---|---|
| | | 1 | 2 | 3 | 4 | 5 | 6 | 7 | 8 |
| Ink composition (% by mass) | C.I. Acid Blue 90 (B) | 3 | 3 | 2.6 | 3 | 3 | 1 | 0.5 | 3.6 |
| | C.I. Direct Yellow 86 | 2 | — | 1.7 | 2 | — | 2 | 2 | 2.4 |
| | C.I. Direct Yellow 132 | — | 2 | — | — | 2 | — | — | — |
| | Dye (M-1) | 1 | 1 | 0.9 | 1 | 1 | 1 | 1 | 1.2 |
| | C.I. Direct Blue 199 (C) | 1.5 | 1.5 | 1.3 | 1.8 | 1.8 | 3.5 | 4 | 1.8 |
| | Glycerol | 18 | 18 | 18 | 18 | 18 | 18 | 18 | 18 |
| | Triethylene glycol-n-butyl ether | 4 | 4 | 4 | 4 | 4 | 4 | 4 | 4 |
| | Olfine (trade name) E1010 (*1) | 0.2 | 0.2 | 0.2 | 0.2 | 0.2 | 0.2 | 0.2 | 0.2 |
| | Sunnol (trade name) NL-1430 (*2) | 0.2 | 0.2 | 0.2 | 0.2 | 0.2 | 0.2 | 0.2 | 0.2 |
| | Water | balance | balance | balance | balance | balance | balance | balance | balance |
| Total content of dyes (% by mass) | | 7.5 | 7.5 | 6.5 | 7.8 | 7.8 | 7.5 | 7.5 | 9.0 |
| C/B | | 0.50 | 0.50 | 0.50 | 0.60 | 0.60 | 3.5 | 8.0 | 0.50 |
| Optical Density (OD value) | | A | A | A | A | A | A | A | AA |
| Light resistance C component | | A | A | A | AA | AA | AA | AAA | AA |
| M component | | AA | AA | AA | AA | AA | AA | AA | AA |
| Y component | | AA | AA | AA | AA | AA | AA | AA | AA |
| Total evaluation | | A | A | A | AA | AA | AA | A | AA |

| | | Comparative Examples | | | | |
|---|---|---|---|---|---|---|
| | | 1 | 2 | 3 | 4 | 5 |
| Ink composition (% by mass) | C.I. Acid Blue 90 (B) | — | 4.5 | 3 | 3 | 2.1 |
| | C.I. Direct Yellow 86 | 2 | 2 | 2 | — | 1.4 |
| | C.I. Direct Yellow 132 | — | — | — | 2 | — |

TABLE 1-continued

|  |  |  |  |  |  |
|---|---|---|---|---|---|
| Dye (M-1) | 1 | 1 | 1 | 1 | 0.7 |
| C.I. Direct Blue 199 (C) | 4.5 | — | 0.9 | 0.9 | 1.1 |
| Glycerol | 18 | 18 | 18 | 18 | 18 |
| Triethylene glycol-n-butyl ether | 4 | 4 | 4 | 4 | 4 |
| Olfine (trade name) E1010 (*1) | 0.2 | 0.2 | 0.2 | 0.2 | 0.2 |
| Sunnol (trade name) NL-1430 (*2) | 0.2 | 0.2 | 0.2 | 0.2 | 0.2 |
| Water | balance | balance | balance | balance | balance |
| Total content of dyes (% by mass) | 7.5 | 7.5 | 6.9 | 6.9 | 5.3 |
| C/B | — | — | 0.30 | 0.30 | 0.52 |
| Optical Density (OD value) | B | A | A | A | B |
| Light resistance C component | AAA | B | B | B | A |
| M component | AA | AA | AA | AA | AA |
| Y component | A | AA | AA | AA | AA |
| Total evaluation | A | B | B | B | A |

As indicated in Table 1, in Examples 1 to 8, the evaluation results were satisfactory in relation to the optical density (OD value) and light resistance. Examples 1 and 4, which used the same dyes and had different mass ratios (C/B), were compared with each other. Examples 2 and 5, which used the same dyes and had different mass ratios (C/B), were compared with each other. In Examples 4 and 5 satisfying C/B≥0.6, the evaluation result of light resistance was better than those of Examples 1 and 2 satisfying C/B≤0.6. The reduction percentages of C, M, Y components in the OD values after light irradiation in Example 4 and 5 were almost equivalent. Changes in color (changes in hue balance) before and after light irradiation in Examples 4 and 5 were small. Next, Example 6 was compared to Example 7. In Example 6 satisfying C/B≤3.5, the evaluation result of light resistance was better than that of Example 7 having the same conditions except for a condition in which C/B>3.5 was satisfied. The reduction percentages of C, M, Y components in the OD values after light irradiation in Example 6 were almost equivalent. Change in color (change in hue balance) before and after light irradiation in Example 6 was small. Next, Example 1 was compared to Example 8. In Example 8 in which the total content of dyes was equal to or more than 9% by mass, the evaluation result of the optical density (OD value) was better than that of Example 1 having the same conditions except for a condition in which the total content of dyes was less than 9%.

In Comparative Example 1 using no blue dye, the evaluation result of the optical density (OD value) was bad. In Comparative Example 2 using no copper phthalocyanine dye, the evaluation result of light resistance was bad. In Comparative Examples 3 and 4 satisfying C/B<0.5, the evaluation result of light resistance was bad. In Comparative Examples 2 to 4, the reduction percentage of C component in the OD value after light irradiation was larger than those of the M and Y components. This made changes in color (changes in hue balance) before and after light irradiation in Comparative Examples 2 to 4 large. In Comparative Example 5 in which the total content of dyes was less than 6% by mass, the evaluation result of optical density (OD value) was bad.

As described above, the water-based ink of the present teaching has high optical density (OD value) and high light resistance. The way of use of the water-based ink of the present teaching is not particularly limited and is widely applicable to a variety of ink-jet recording.

What is claimed is:

1. A water-based ink for ink-jet recording comprising dyes and water, the dyes comprising:
   a blue dye having a hue angle of 220° to 280°;
   a yellow dye having a hue angle of 70° to 120°; and
   a copper phthalocyanine dye,
   wherein a mass ratio (C/B) of a content (C) of the copper phthalocyanine dye to a content (B) of the blue dye in an entire amount of the water-based ink is equal to or more than 0.5, and
   a total content of the dyes in the entire amount of the water-based ink is equal to or more than 6% by mass.

2. The water-based ink for ink-jet recording according to claim 1, wherein the dyes further comprise a magenta dye having a hue angle of 330° to 360° or 0° to 10°.

3. The water-based ink for ink-jet recording according to claim 1, wherein the following condition (1) is satisfied, $$LB > LY > LC \tag{1}$$

in the condition (1),
   LB: an OD value reduction percentage (%) of an image recorded on glossy paper at 100% Duty by use of 4% by mass of aqueous solution of the blue dye, the reduction percentage being determined by the following equation (I),
   LY: an OD value reduction percentage (%) of an image recorded on glossy paper at 100% Duty by use of 4% by mass of aqueous solution of the yellow dye, the reduction percentage being determined by the following equation (I), and
   LC: denotes an OD value reduction percentage (%) of an image recorded on glossy paper at 100% Duty by use of 4% by mass of aqueous solution of the copper phthalocyanine dye, the reduction percentage being determined by the following equation (I), $$\text{OD value reduction percentage } (\%) = \{(X-Y)/X\} \times 100 \tag{I}$$

in the equation (I),
   X: an OD value of each of the images immediately after recording, and
   Y: an OD value of each of the images after light irradiation is performed for 70 hours by use of a xenon weather meter.

4. The water-based ink for ink-jet recording according to claim 2, wherein the following condition (2) is satisfied, $$LB > LM > LC \tag{2}$$

in the condition (2),
   LB: an OD value reduction percentage (%) of an image recorded on glossy paper at 100% Duty by use of 4% by mass of aqueous solution of the blue dye, the reduction percentage being determined by the following equation (I), LM: an OD value reduction percentage (%) of an image recorded on glossy paper at 100% Duty by use of 4% by mass of aqueous solution of the magenta dye, the reduction percentage being determined by the following equation (I), and LC: an OD value reduction percentage (%) of an image recorded on glossy paper at 100% Duty by use of 4% by mass of aqueous solution of the copper phthalocyanine dye, the reduction percentage being determined by the following equation (I), OD value reduction percentage (%)={(X−Y)/X}×100    (I)

in the equation (I),

X: an OD value of each of the images immediately after recording, and

Y: an OD value of each of the images after light irradiation is performed for 70 hours by use of a xenon weather meter.

5. The water-based ink for ink-jet recording according to claim 2, wherein the following condition (3) is satisfied,

LB>LY>LM>LC    (3)

in the condition (3),

LB: an OD value reduction percentage (%) of an image recorded on glossy paper at 100% Duty by use of 4% by mass of aqueous solution of the blue dye, the reduction percentage being determined by the following equation (I), LY: an OD value reduction percentage (%) of an image recorded on glossy paper at 100% Duty by use of 4% by mass of aqueous solution of the yellow dye, the reduction percentage being determined by the following equation (I), LM: an OD value reduction percentage (%) of an image recorded on glossy paper at 100% Duty by use of 4% by mass of aqueous solution of the magenta dye, the reduction percentage being determined by the following equation (I), and LC: an OD value reduction percentage (%) of an image recorded on glossy paper at 100% Duty by use of 4% by mass of aqueous solution of the copper phthalocyanine dye, the reduction percentage being determined by the following equation (I), OD value reduction percentage (%)={(X−Y)/X}×100    (I)

in the equation (I),

X: an OD value of each of the images immediately after recording, and

Y: an OD value of each of the images after light irradiation is performed for 70 hours by use of a xenon weather meter.

6. The water-based ink for ink-jet recording according to claim 1, wherein the mass ratio (C/B) of the content (C) of the copper phthalocyanine dye to the content (B) of the blue dye in the entire amount of the water-based ink is equal to or more than 0.5 and equal or less than 8.0.

7. The water-based ink for ink-jet recording according to claim 1, wherein the mass ratio (C/B) of the content (C) of the copper phthalocyanine dye to the content (B) of the blue dye in the entire amount of the water-based ink is equal to or more than 0.6 and equal or less than 3.5.

8. The water-based ink for ink-jet recording according to claim 1, wherein the total content of the dyes in the entire amount of the water-based ink is equal to or more than 9% by mass.

9. The water-based ink for ink-jet recording according to claim 1, wherein the total content of the dyes in the entire amount of the water-based ink is 6% by mass to 10% by mass.

10. The water-based ink for ink-jet recording according to claim 1, wherein the blue dye has no phthalocyanine structure.

11. The water-based ink for ink-jet recording according to claim 1, wherein the blue dye comprises C.I. Acid Blue 90.

12. The water-based ink for ink-jet recording according to claim 1, wherein the yellow dye comprises at least one of C.I. Direct Yellow 86 and C.I. Direct Yellow 132.

13. The water-based ink for ink-jet recording according to claim 1, wherein the copper phthalocyanine dye comprises C.I. Direct Blue 199.

14. The water-based ink for ink-jet recording according to claim 2, wherein the magenta dye comprises a dye represented by the following formula (1):

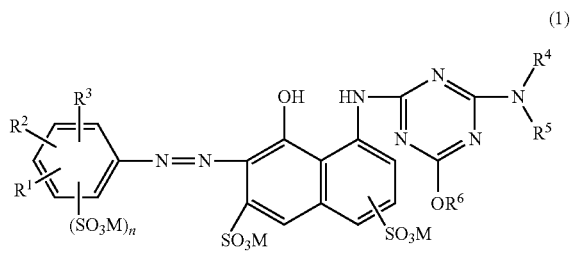

in the formula (1), n is 0, 1, or 2 each of $R^1$, $R^2$, and $R^3$ is a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, a sulfonic ester group, a substituted or non-substituted alkylsulfonyl group, a substituted or non-substituted arylsulfonyl group, a carboxy group, or a carboxylic ester group;

$R^1$, $R^2$ and $R^3$ are identical to or different from each other;

each of $R^4$, $R^5$ and $R^6$ is a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, or a substituted or non-substituted heterocyclic group;

$R^4$, $R^5$ and $R^6$ are identical to or different from each other;

when any one of $R^1$ to $R^6$ has at least one acid group, the at least one acid group is non-neutralized acid or salt thereof;

each of three Ms is H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, or $C_2H_4NH_2$; and the three Ms are identical to or different from each other.

15. The water-based ink for ink-jet recording according to claim 1, wherein the blue dye is C.I. Acid Blue 90, the yellow dye is at least one of C.I. Direct Yellow 86 and C.I. Direct Yellow 132; and the copper phthalocyanine dye is C.I. Direct Blue 199.

16. The water-based ink for ink-jet recording according to claim 15, wherein the dyes comprise a dye represented by the following formula (1):

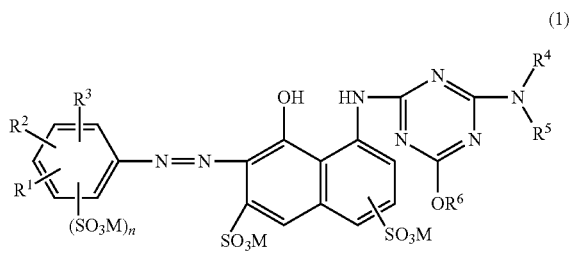

in the formula (1), n is 0, 1, or 2 each of $R^1$, $R^2$, and $R^3$ is a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, a sulfonic ester group, a substituted or non-substituted alkylsulfonyl group, a substituted or non-substituted arylsulfonyl group, a carboxy group, or a carboxylic ester group;

$R^1$, $R^2$ and $R^3$ are identical to or different from each other;

each of $R^4$, $R^5$ and $R^6$ is a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, or a substituted or non-substituted heterocyclic group;

$R^4$, $R^5$ and $R^6$ are identical to or different from each other;

when any one of $R^1$ to $R^6$ has at least one acid group, the at least one acid group is non-neutralized acid or salt thereof;

each of three Ms is H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, or $C_2H_4NH_2$; and the three Ms are identical to or different from each other.

17. The water-based ink for ink-jet recording according to claim 1, wherein the water-based ink for ink-jet recording is a water-based black ink.

18. The water-based ink for ink-jet recording according to claim 1, wherein the dyes comprise no black dye.

* * * * *